United States Patent

[11] 3,553,383

[72] Inventor Gustaaf Rochtus
Blaasveld, Belgium
[21] Appl. No. 714,273
[22] Filed Mar. 19, 1968
[45] Patented Jan. 5, 1971
[73] Assignee International Standard Electric Corporation
New York, N.Y.
a corporation of Delaware
[32] Priority Mar. 22, 1967
[33] Netherlands
[31] No. 6704276

[54] HOSPITAL COMMUNICATION SYSTEM HAVING PROVISION FOR CONNECTING PATIENT WITH NEAREST NURSE-OCCUPIED STATION
24 Claims, 3 Drawing Figs.

[52] U.S. Cl. .......... 179/18
[51] Int. Cl. .......... H04m 3/00
[50] Field of Search .......... 179/37, 38, 39, 40, 18.03, 18.04, 5

[56] References Cited
UNITED STATES PATENTS

| | | | |
|---|---|---|---|
| 2,496,629 | 2/1950 | Lamberty et al. | 340/312 |
| 2,740,842 | 4/1956 | Schneider et al. | 179/27 |

*Primary Examiner*—Kathleen H. Claffy
*Assistant Examiner*—David L. Stewart
*Attorneys*—C. Cornell Remsen, Jr., Walter Baum, Percy P. Lantzy, Philip M. Bolton, Isidore Tugut and Charles L. Johnson, Jr.

ABSTRACT: A communication system adapted to find the closest available station to the calling station. The attempt to reach an available station out of a plurality of stations is accomplished by test means which test the availability of the plurality of stations so that they are selected in an order depending on the identity of the calling stations.

Inventor

GUSTAAF ROCHTUS

By

Attorney

Inventor
GUSTAAF ROCHTUS
By [signature]
Attorney

Inventor
GUSTAAF ROCHTUS
By [signature]
Attorney

HOSPITAL COMMUNICATION SYSTEM HAVING PROVISION FOR CONNECTING PATIENT WITH NEAREST NURSE-OCCUPIED STATION

COMMUNICATION SYSTEM

The present invention relates to a communication system enabling the establishment of connections between stations with the possibility for a calling station, when an attempt is made to reach an available station, to be connected to any one out of a plurality of stations of at least one group.

Such a communication system is well known in the PBX art and it is an object of the present invention to provide a communication system of this type particularly adapted to find an available station closest to the calling station.

The present communication system is particularly characterized in that it includes test means to test the availability of said plurality of stations which are selected in order depending on the identity of the calling station.

Another characteristic of the present communication system is that said order depends on the location of said stations with respect to said calling station.

Still another characteristic of the present communication system is that said order corresponds to increasing distances between said calling station and the tested stations.

Such a system is particularly, but not exclusively, adapted to be used in hospitals since it permits a patient when making a call to automatically reach a room, wherein a nurse is present, closest to his and without disturbing nurses present in other rooms.

The above mentioned and other objects and features of the invention will become more apparent and the invention itself will be best understood by referring to the following description of embodiments taken in conjunction with the accompanying drawings wherein.

A communication system particularly adapted to be used in hospitals will hereinafter be described, the above mentioned station and main stations being constituted by five patient rooms and the hospital exchange respectively. These five rooms are supposed to be located next to each other on a same floor. For convenience of the description a room wherein a nurse is present will hereinafter be called an "available" room.

Figure 1:
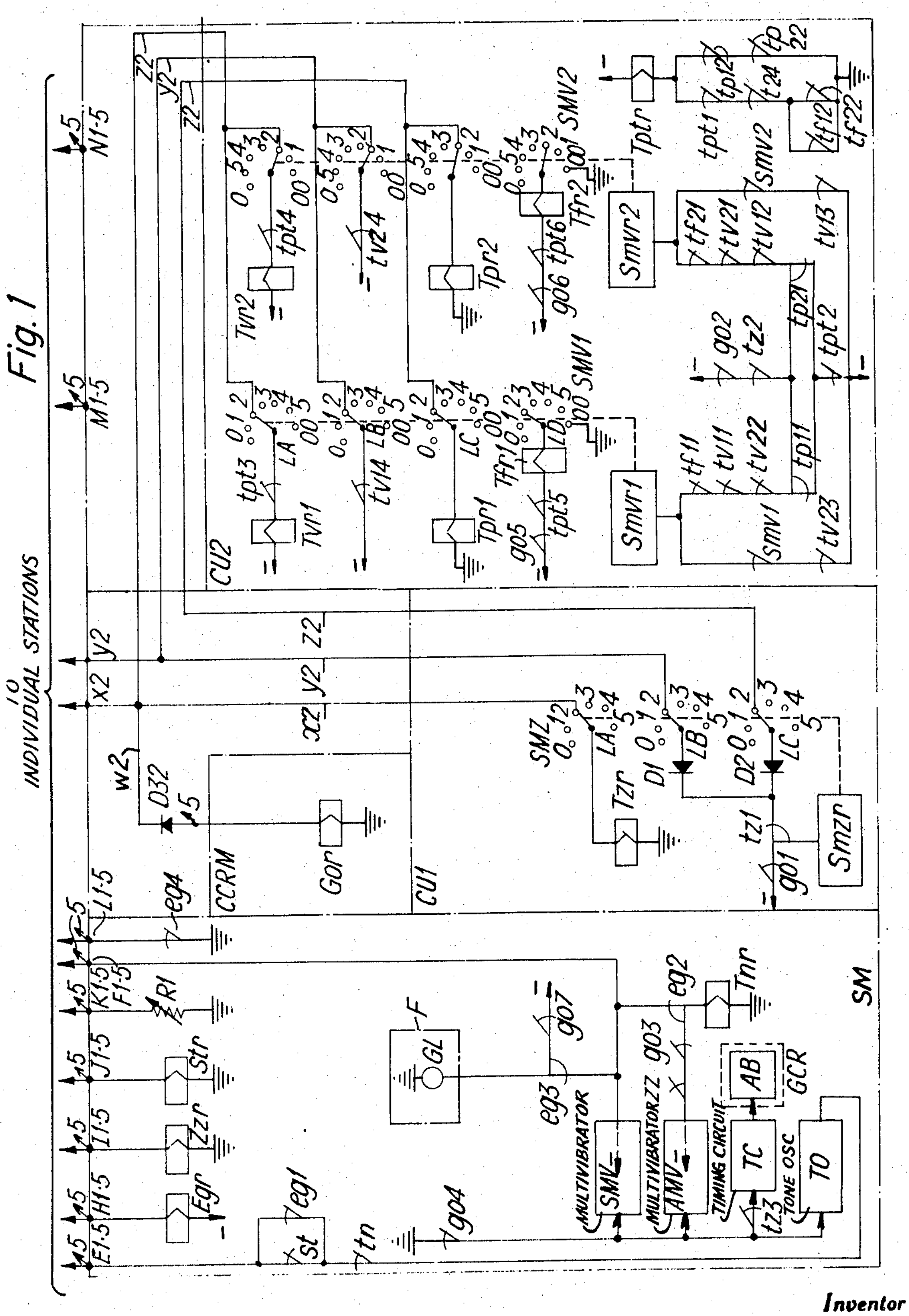
FIG. 1 represents circuitry provided in a main station included in a communication system according to the invention.

Principally referring to FIG. 1 the exchange shown therein includes a calling room control unit CU1, an available room control unit CU2, a calling condition registering means CCRM and signalling means SM.

The control unit CU1 includes a detection circuit, a first communication control circuit and a marking circuit.

Figure 2:
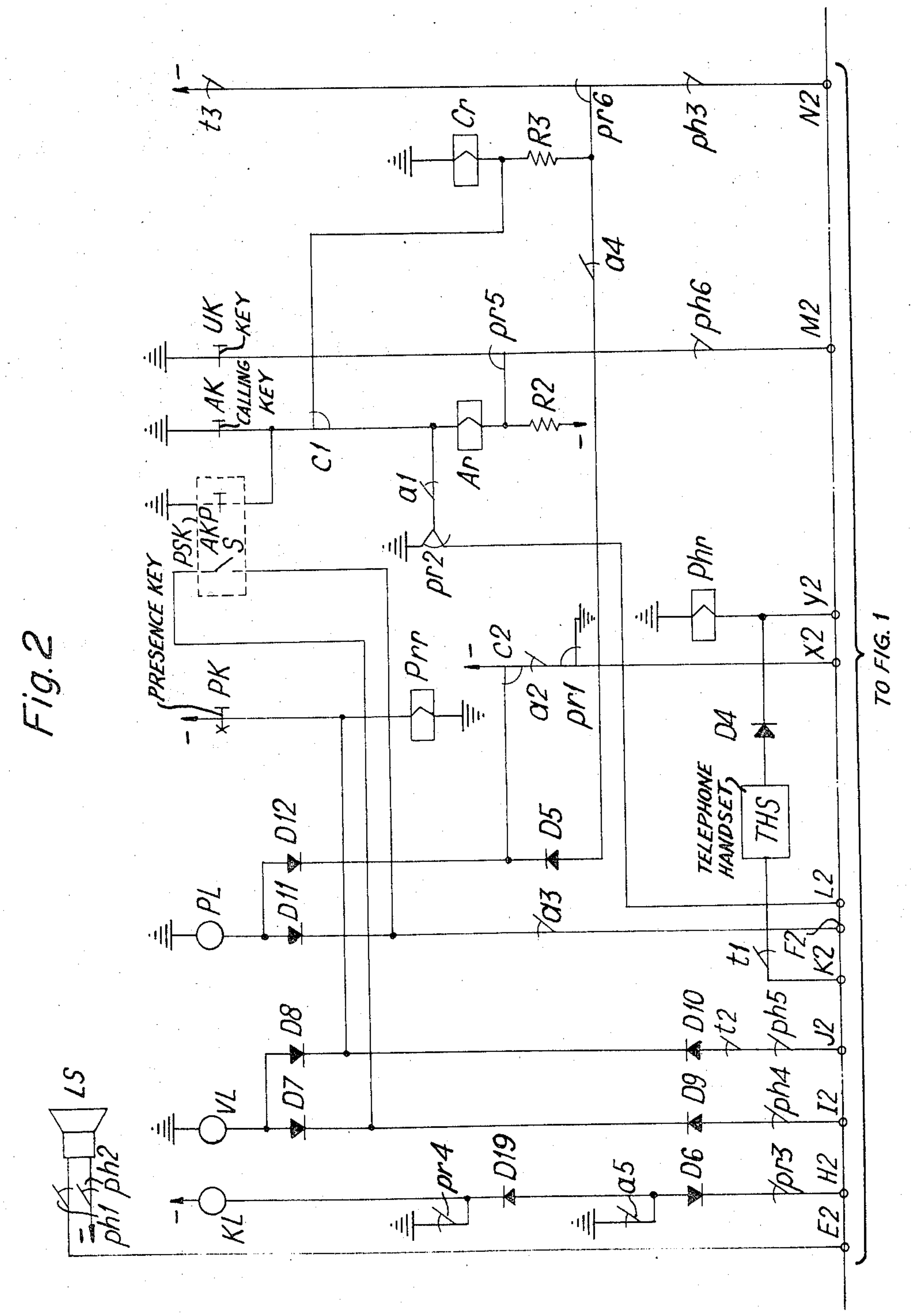
FIG. 2 shows circuitry provided in one of the stations included in this system.

**The detection circuit includes the level LA of a three-level rotary selector switch SMZ the corresponding brush of which is at one end connected to ground via the winding of a relay T*zr* and the five plots 1—5 of which are each connected to terminal X1—5 via an individual control lead *x*1—5, the latter terminals being each connected to a corresponding terminal of one of the above five patient rooms. Only the connection of plot 2 via control lead *x*2 to terminal X2 connected to the second patient room shown in FIG. 2 is represented in FIG. 1.**

**The first communication control circuit includes the level LB of the above rotary selector switch SMZ the corresponding brush of which is at one end coupled to battery via diode rectifier D1, changeover contact *tz*1 of relay T*zr* and make contact *go*1 of relay G*or* included in the CCRM. The five plots 1—5 of this level LB are each connected to a terminal Y1—5 via an individual control lead *y*1—5, the latter terminals being each connected to a corresponding terminal of a respective one of the above five patient rooms. Only the connection of plot 2 via control lead *y*2 to terminal Y2 connected to the second patient room shown in FIG. 2 is represented in FIG. 1.**

The marking circuit includes the level LC of the above rotary selector switch SMZ the corresponding brush of which is at one end coupled to battery via diode rectifier D2 and the above contacts *tz*1 and *go*1, and the five plots 1—5 of which are each connected to the control unit CU2 via an individual marking lead *z*1—5. Only the connection of plot 2 to the control unit CU2 via marking lead *z*2 is represented in FIG. 1.

It should be noted that the levels LA, LB and LC of switch SMZ each include a plot 0 which is free and which corresponds to the rest position of this switch.

The electromagnet S*mzr* when operated is capable of stepping the above three-level rotary selector switch SMZ through its six positions 0 to 5 and is of a classical construction. It is supposed to be operated when a battery is applied to its input via make contact *go*1 and changeover contact *tz*1.

The control unit CU2 includes two test devices, two second communication control circuits and two final position detection devices.

The first of these test devices includes the levels LA and LC of a four-level rotary selector switch SMV1. The brush of the level LA is at one end connected to battery via make contact *tpt*3 of relay T*ptr* and the winding of relay T*vr*1, and the five plots 1—5 of this level LA are each connected to a respective one of the above terminals X1—5 via an individual control lead *u*1—5. Only the connection of plot 2 of level LA to terminal X2 via control lead *u*2 is represented in FIG. 1. The brush of the level LC of the switch SMV1 is at one end connected to ground via the winding of relay T*pr*1, and the five plots 1—5 of this level LC are each connected to a respective one of the above marking leads *z*1—5. Only the connection of plot 2 of level LC to marking lead *z*2 is represented in FIG. 1. The second of the two test devices is identical to the above described one SMV1, *tpt*3, T*vr*1 and T*pr*1 being replaced by smv2, tpt4, T*vr*2 and T*pr* 2, and the plots 1—5 of its level LA and LC are connected to the plots 1—5 of the levels LA and LC of the first test device. It should be noted that the plots 1—5 of SMV1 and SMV2 are arranged in an opposite order.

One of the second communication control circuits includes the level LB of the rotary selector switch SMV1 the corresponding brush of which is at one end connected to battery via make contact *tv*14 of the relay T*vr*1 and the five plots 1—5 of which are each connected to an output terminal Y1—5 via an individual control lead *v*1—5. Only the connection of plot 2 to terminal Y2 via control lead *v*2 is represented in FIG. 1. The other of the second communication control circuits is identical to the above described first one, SMV1 and *tv*14 being replaced by SMV2 and *tv*24 which is a contact of relay T*vr*2, and the plots 1—5 of its level LB are connected to the plots 1—5 of the level LB of the above one second communication control circuit.

It should be noted that the above levels LA, LB and LC of the switches SMV1 and SMV2 each include a plot 0 and a plot 00 which are both free and which correspond to the rest and final positions of this switch respectively.

One of the final position detection devices includes the level LD of the switch SMV1 the brush of which is at one end connected to battery via the winding of a relay T*fr*1 and make contacts *tpt*5 of relay T*ptr* and *go*5 of relay G*or* and the plots 0—5 of which are free, whereas the plot 00 is connected to ground. Plots 0 and 00 correspond to the rest and final positions of the switch respectively. The other of the final position detection devices is identical to the above described one, SMV1, T*fr*1, *go*5 and *tp*5 being replaced by SMV2, T*fr*2, *go*6 and *tpt*6 respectively.

The electromagnets S*mvr*1 and S*mvr*2 when operated are capable of stepping the above four-level rotary switches SMV1 and SMV2 successively through their seven positions 0, 1, 2, 3, 4, 5, 00 and 0, 5, 4, 3, 2, 1, 00 respectively and are of a classical construction. It is supposed that they are operated when a battery is applied to their input. Each of these switches has a make contact *smv*1, *smv*2 which is only in its open position when the switch is in its rest position 0. The control unit CU2 finally also includes the relay T*ptr* which is involved in the operation of the above electromagnets S*mvr*1 and S*mvr*2 and of the above test devices, more particularly of the relays T*vr*1 and T*vr*2 included therein.

The calling condition registering means CCRM includes relay for G*or* the winding of which is at one end connected to ground and at the other end connected to the terminals X1—5 via the diode rectifiers D31—D35 and the control leads *w*1—5 respectively. Only the connection between the relay G*or* and the terminal X2 via the diode rectifier D32 and the control lead *w* 2 is represented in FIG. 1.

The signalling means SM include a tone oscillator TO, a timing circuit TC, an asymmetrical multivibrator AMV and a symmetrical multivibrator SMV, in which symmetry here refers to duty cycle, and the symmetrical multivibrator SMV has a 50 percent duty cycle, while the asymmetrical multivibrator has other than a 50 percent duty cycle.

The inputs of TO, AMV and SMV are coupled to ground via make contact *go*4 and are supposed to be operated when this ground is effectively applied to their input. The input of the timing circuit TC is connected to ground via a make contact *tz*3 of relay T*zr* and the above make contact *go*4 and is also supposed to be operated when this ground is effectively applied to this input.

The output of the tone oscillator TO is connected to the terminal E1—5 via make contact *tn* of relay T*nr* and the parallel connection of break contact *st* of relay S*tr* and of make contact *eg*1 of relay E*gr*. The terminal E1—5 is connected to a corresponding terminal in each of the five patient rooms, such as E2 of the second patient room shown in FIG. 2. The output of the timing circuit TC is connected to an alarm buzzer AB which is mounted in a general control room GCR wherein a head nurse is present, a floor indicating lamp (not shown) being associated to the alarm buzzer. When this timing circuit has counted a predetermined time interval the alarm buzzer AB is operated. The output of the asymmetrical multivibrator AMV is coupled to ground via break contact *zz* of relay Z*zr*, make contact *go*3 of relay G*or*, changeover contact *eg*2 of relay E*gr* and winding of relay T*nr*. When operated the AMV applies a battery to its output in an intermittent way i.e. during time intervals of about 2 seconds separated by idle time intervals of about 28 seconds. The output of the symmetrical multivibrator SMV is coupled, firstly to ground via the above contact *eg*2 and the winding of relay T*nr*, secondly to terminal F1—5 which is connected to a corresponding terminal in each of the five patient rooms, such as F2 of the second patient room shown in FIG. 2, and thirdly to ground via changeover contact *eg*3 and the floor indicating lamp GL. This lamp GL is at one end connected to ground and at the other end coupled to battery via changeover contact *eg*3 and make contact *go*7. The floor indicating lamp GL is mounted on the floor F of the above five patient rooms and is connected in parallel with a GL lamp on each of the other floors. Hence on each floor there are a number of GL lamps equal to the number of floors. When operated the SMV applies a battery to its output in an intermittent way during time intervals of 330 milliseconds separated by idle time intervals of 330 milliseconds i.e. with a period of 660 milliseconds.

The signalling means SM further include the relay E*gr* the winding of which is at one end connected to battery and at the other end connected to the terminal H1—5 which is connected to a corresponding terminal in each of the five patient rooms, such as H2 of the second patient room shown in FIG. 2. The relay E*gr* is used to indicate that a nurse is making an alarm call, as will be described later. The winding of relay Z*zr* is at one end connected to ground and at the other end connected to the terminal I1—5 which is connected to a corresponding terminal in each of the five patient rooms, such as I2 of the above second patient room shown in FIG. 2. The relay Z*zr* is used to indicate that a very ill patient is making a call. The winding of relay S*tr* is at one end connected to ground and at the other end connected to the terminal J1—5 which is connected to a corresponding terminal in each of the five patent rooms, such as J2 of the above second patient room shown in FIG. 2. The relay S*tr* is used to indicate that a nurse has hooked-off her telephone. A variable resistance R1, which is at one end connected to ground, is at the other end connected to terminal K1—5 which is connected to a corresponding terminal in each of the five patient rooms, such as K2 of the above second patient room. As will become clear later, the latter terminals each constitute one end of a communication circuit so that the above resistance is connected in common to these one ends. Finally, a ground is connected via make contact *eg*4 to terminal L1—5 which is connected to a corresponding terminal in each of the five patient rooms, such as L2 of the above second patient room.

Principally referring to FIG. 2 the second patient room shown therein includes a telephone handset THS relays A*r*, C*r*, P*hr* and P*rr*, keys PK, AK, PSK and UK, lamps KL, VL, PL and loudspeaker LS.

The terminals K2 and Y2 are interconnected by a communication circuit which is constituted by the series connection of a cradle make contact *t*1 of the telephone included in THS the telephone handset THS and the decoupling diode rectifier D4. The terminal Y2 is also connected to ground via the winding of relay P*hr* which is used to register the fact that the corresponding communication circuit has been effectively controlled by one of the communication control circuits in the main station, as will become clear later.

The nonlocking calling key AK is at one end connected to ground and the other end connected to battery via changeover contact *c*1 of relay C*r*, the winding of relay A*r* and resistance R2. Relay A*r* forms part of a calling condition registering circuit and is adapted to register the fact that a call has been made in the room. The junction point of the winding of relay A*r* and changeover contact *c*1 is coupled to ground and to terminal L2 via make contact *a*1 of relay A*r* and changeover contact *pr*2 of relay P*rr*. The junction point of the winding of relay A*r* and the resistance R2 is coupled to terminal M2 via changeover contact *pr*5 of relay P*rr* and make contact *ph*6 of relay P*hr*. The latter terminal M2 is connected to a corresponding terminal in each of the other four patient rooms.

The key PSK includes a key contact AKP which is of the nonlocking type and which is at one end connected to ground and at the other end connected to the above contact *c*1, and a strap S which is at one end connected to the junction points of the diode rectifiers D7 and D9 and at the other end connected to the junction point of diode rectifier D11 and make contact *a*3. This key PSK permits a very ill patient to make a call, as will be described later.

The calling condition removal key UK which is of the nonlocking type is at one end connected to ground and at the other end coupled to the above terminal M2 via the contacts *pr*5 and *ph*6. This key UK permits the removal of the calling condition of one of the other four patient rooms by releasing relay A*r* therein, as will also be described later.

The winding of relay C*r* is at one end connected to ground and at the other end, firstly coupled to ground via changeover contact *c*1 and keys AK, AKP in parallel, secondly to input terminal N2 via resistance R3, changeover contact *pr*6 or relay P*rr* and make contact *ph*3 of relay P*hr*, and thirdly to battery via the same resistance R3, make contact *a*4 of relay A*r*, diode rectifier D5 and changeover contact *c*2 of relay C*r*. The terminal N2 is connected to a corresponding terminal in each of the other four patient rooms.

The telephone of the telephone handset THS includes a make contact *t*3 which is temporarily closed when the telephone is hooked-on. This contact *t*3 is at one end connected to battery and at the other end coupled to the above terminal N2 via contacts *pr*6 and *ph*3. This contact *t*3 permits the one of the four other rooms which is in the calling condition, to be set to the waiting condition, by operating relay C*r* therein, as will be described later.

The nurse presence key PK which is of the locking type is at one end connected to battery and at the other end connected to ground via the winding of relay P*rr*. Relay P*rr* forms part of an availability condition registering circuit and is adapted to register the fact that the room is available i.e. that a nurse is present in this room.

The above lamp KL is a calming lamp and is mounted in the room, whereas the lamps PL and VL are mounted above the door of the room considered. The lamp KL is steadily lit when a patient is making a call or when a nurse is present in the room (key PK operated). The lamp PL is steadily lit when a call has been put in the waiting condition, whereas it is intermittently lit when a call is made. The lamp VL is steadily lit when a nurse is present in the room, whereas it is intermittently lit when a very ill patient is making a call. The lamp KL is at one end connected to battery and at the other end coupled to ground, firstly via make contact *pr*4 of relay P*rr*, and secondly via diode D19 and make contact *a*5 of relay A*r*. The latter contact *a*5 is also connected to terminal H2 via diode rectifier D6 and make contact *pr*3 of relay P*rr*. The lamp VL is at one end connected to ground and at the other end coupled, firstly to terminal F2 via diode rectifier D7, strap S, make contact *a*3 of relay A*r* and, secondly, to ground via diode rectifier D8 and the winding of the above relay P*rr*. Terminal I2 is connected to terminal F2 via make contact *ph*4 of relay P*hr*, diode rectifier D9, strap S and the above make contact *a*3, whereas terminal J2 is connected to battery via make contact *ph*5 of relay P*hr*, cradle make contact *t*2 of the telephone handset THS diode rectifier D10 and the nurse presence key PK. The above lamp PL is at one end connected to ground and at the other end coupled, firstly to terminal F2 via diode rectifier D11 and make contact *a*3 and, secondly, to battery via diode rectifier D12 and changeover contact *c*2 of relay C*r*. Terminal X2 is coupled to ground via changeover contact *pr*1 of relay *prr*, and to battery via changeover contact *pr*1, make contact *a*2 of relay A*r* and changeover contact *c*2. Finally, one of the two terminals of the loudspeaker LS is coupled to battery via make contact *ph*2 of relay P*hr*, whereas the other of the two terminals is connected to terminal E2 via make contact *ph*1 of relay P*hr*.

The operation of the above described communication system is as follows:

When a nurse enters a room such as the third room (not shown), she operates the presence key PK therein due to which the relay P*rr* having contacts *pr*1 to *pr*6 is energized between battery and ground and the lamp VL mounted above the door of this room is steadily lit between ground and battery via diode rectifier D8, thus indicating the presence of a nurse in this room. By the change of position of changeover contact *pr*1 a ground is applied to terminal X3 (not shown) and hence to the third plot of the level LA of the selector switch SMZ via the control lead *x*3 (not shown) and to the third plots of the levels LA of the selector switches SMV1 and SMV2 via control lead *u*3 (not shown). By the change of position of changeover contact *pr*2 the make contact *a*1 of relay A *r* is effectively connected to terminal L3 (not shown) and thus a holding circuit is prepared for this relay; by the closure of make contact *pr*3 the cathode of diode rectifier D6 is effectively connected to terminal H3 (not shown) so that the eventual operation of relay E*gr* is prepared; by the closure of make contact *pr*4 the lamp KL mounted in the third room considered is steadily lit, thus visually indicating the presence of a nurse in this room; by the change of position of changeover contact *pr*5 the key UK is effectively connected to make contact *ph*6 and thus the eventual removal of the calling condition in another room is prepared, the term "calling condition" meaning a call initiated by a patient which hasn't yet been satisfied, and the removal of this condition indicating that a nurse has communicated with the patient with such communication satisfying the calling condition; finally, by the change of position of changeover contact *pr*6 the telephone contact *t*3 is effectively connected to make contact *ph*3 and thus a circuit is prepared for eventually bringing another room in the waiting condition.

When a patient in a room e.g. in the second room represented in FIG. 2 wants to speak with a nurse he hooks-off his telephone and operates the calling key AK. Due to the telephone being hooked-off the make contacts *t*1 and *t*2 are closed. By the closure of contact *t*1 the telephone handset THS included in the communication circuit of the second room is effectively connected to ground via variable resistance R1, terminal K2 and make contact *t*1. By the closure of contact *t*2 the make contact *ph*5 is effectively connected to the anode of the diode rectifier D10. Due to the operation of calling key AK the relay A*r* with five contacts *a*1—5 is energized between ground and battery via this key AK, changeover contact *c*1, winding of relay A*r* and resistance R2. By the closure of its make contact *a*1 the relay A*r* is locked via this contact *a*1 and changeover contact *pr*2. By the closure of make contact *a*2 a battery is applied to terminal X2 via changeover contact *c* 2, make contact *a*2 and changeover contact *pr*1 due to which relay G*or* in the exchange is energized via control lead *w*2 and diode rectifier D32, whereas this battery is connected to the second plot of the level LA of SMZ via control lead *x*2 and to the second plots of the levels LA of SMV1 and SMV2 via control lead *u*2. By the closure of make contact *a*3 the lamp PL mounted above the door of the second room is connected between ground and the output of the symmetrical multivibrator SMV via diode rectifier D11, make contact *a*3 and terminal F2. The closed make contact *a*4 effectively connects the resistance R3 to the changeover contact *c*2 via the diode rectifier D5; and by the closed make contact *a*5 the lamp KL mounted in the second room is connected between ground and battery via this contact *a*5 and the diode rectifier D19 so that this lamp KL is steadily lit, thus indicating to the calling patient that his call is being handled. The energized relay G*or* operates its seven contacts *go*1—*go*7. By the closure of make contact *go*1 a battery is applied to the electromagnet S*mrz* via this contact *go*1 and changeover contact *tz*1 so that the selector switch SMZ is operated and starts stepping through its six positions 0—5 in order to detect the calling room; by the closure of make contact *go*2 a battery is connected to make contact *tz*2; by the closure of make contact *go*3 the output of the asymmetrical multivibrator AMV is connected to ground via contacts *zz*, *go*3, *eg*2 and the winding of relay T*hr*; by the closure of make contact *go*4 an operating ground is connected to the symmetrical multivibrator SMV, the asymmetrical multivibrator AMV, and the tone oscillator TO; by the closure of make contacts *go*5 and *go*6 a battery is connected to contacts *tpt*5 and *tpt*6 leading to the brushes of the levels LD of the selector switches SMV1 and SMV2 via the windings of relay T*fr*1 and T*fr*2 respectively; finally, by the closure of make contact *go*7 the floor indicating lamp GL is steadily lit between ground and battery via contact *eg*3 and this contact *go*7. The steadily lit floor indicating lamp GL indicates that one of the five rooms of this floor is calling. Also the corresponding GL lamps on the other floors are lit. By the operation of the tone oscillator TO a continuous tone of 1000 c/s is broadcast at its output.

Due to operation of the symmetrical multivibrator SMV a battery is intermittently applied to its output so that lamp PL, mounted above the door of the second room, is intermittently lit in the following circuit: ground, lamp PL, diode rectifier D11, make contact *a*3, terminals F2 and F1—5, and the output of SMV. In this manner a visual indication is given that a patient is calling in the second room.

Due to the operation of the asymmetrical multivibrator AMV a battery is intermittently applied to its output so that relay T*nr* is intermittently energized via contacts *zz go*3 and *eg*2. Consequently a connection is intermittently realized between the output of the tone oscillator TO and the output terminal E1—5 via contacts *tn* and *st*. This tone is not yet applied to the loudspeaker LS in the calling room since relay P*hr* is not yet energized therein.

When the brush of level LA os the stepping selector switch SMZ makes at a certain moment contact with the second plot of this level LA, relay T*zr* with four contacts *tz*1 to *tz*4 is energized since, as described above, a battery has been connected to this second plot.

By the change of position of changeover contact tz1 the operating circuit for the electromagnet Smzr is opened so that this electromagnet is deactivated and that consequently the selector switch SMZ is stopped on this second plot which corresponds to the calling second room. It should be noted that is a nurse would have entered the first room this would have had no influence since, as described above, a ground is then applied to the corresponding plot in the level LA of the selector switch SMZ, such a ground short-circuiting relay Tzr. Due to the above change of position of contact tz1 a battery is applied to terminal Y2, i.e. to the communication circuit in the calling second via contacts go1 and tz1, diode rectifier D1, brush of level LB of SMZ, plot 2 and control lead y2. In other words, the communication circuit of the calling second room is controlled by the communication control circuit of the exchange. A DC current feeding the telephone handset hence flows between ground and battery via resistance R1, terminals K2 and K1—5, contact t1, telephone handset THS diode rectifier D4, terminal Y2, control lead y2, plot 2 of level LB of selector switch SMZ, brush of this level LB, diode rectifier D1, contacts tz1 and go1. Hence this communication circuit is prepared for speaking. Also the relay Phr with six contacts ph1—phdicating the above control or the fact that the calling condition of this room has been detected in the exchange. Moreover, the same battery is applied to the second plots of the levels LC of the rotary switches SMV1 and SMV2 via contacts go1 and tz1, diode rectifier D2, brush of level LC of SMZ, plot 2 and marking lead z2. Thus the marking circuit of the control unit CU1 communicates the identity of the calling room to the test devices included in the control unit CU2 via the marking lead z2.

By the closure of make contact tz2 the electromagnets Smvr1 and Smvr2 are operated since an operating battery is applied to them via contacts go2, tz2, tvtv11, tf11 and go2, tz2, tv22, tv21, tf21 respectively. Consequently the rotary selector switches SMV1 and SMV2 start stepping through their seven positions 0, 1, 2, 3, 4, 5, 00 and 0, 5, 4, 3, 2, 1, 00 respectively, so that the rooms 1 to 5 are scanned in opposite directions. Hereby it should be noted that as soon as the switches SMV1 and SMV2 leave their rest position the make contacts smv1 and smv2 are opened.

By the closure of make contact tz3 the timing 30 circuit TC is operated, and by the closure of make contact tz4 a holding circuit is prepared for relay Tptr.

Due to the relay Phr being energized in the calling room the contacts ph1—ph6 change their position. Due to the closure of make contacts ph1 and ph2 the one and other input terminals of the loudspeaker LS are connected to terminal E2 and to battery respectively so that a 1000 c/s tone, intermittently interrupted by contact tn is broadcast in the calling second room. Thus an audible indication is given to the patient that his call is being handled. By the closure of make contact ph3 terminal N2 is effectively connected to changeover contact pr6 and thus a circuit for eventually bringing the calling room in the waiting condition out of one of the other rooms is prepared; by the closure of make contacts ph4 and ph5 the terminals I2 and J2 are effectively connected to the cathode of diode rectifier D9 and to cradle contact t2 respectively i.e. the eventual operation of relays Zzr and Str is prepared; due to the closure of make contact ph6 the terminal M2 is effectively connected to changeover contact pr5 and thus a circuit for eventually removing the calling condition of the calling room out of one of the other rooms is prepared.

As mentioned above, the operated selector switches SMV1 and SMV2 have started stepping through their above mentioned seven positions. Hereby it should be noted that although a nurse may have entered the first room scanned by SMV1, relay Tvr1 cannot be energized since contact tpt3 is open; also, although nurses may have entered the fifth and fourth rooms and although a nurse is present in the third room scanned by SMV2 relay Tvr2 cannot be energized since contact tpt4 is open. In other words the test means ineffectively test the rooms preceding the calling room. As will be described hereinafter they however effectively test the other rooms. Indeed, when the brush of level LC of selector switch SMV1 makes contact with the plot 2 marked with a battery by the control circuit CU1, as described above, the relay Tpr1 having two contacts tp11 and tp12 is energized. By the change of position of changeover contact tp11 the operating circuit of the electromagnet Smvr1 is opened and consequently the selector switch SMV1 is stopped on the above second plot. By the closure of make contact tp12 the operation of relay Tptr is prepared.

In an analogous manner, when the brush of level LC of SMV2 makes contact with the plot 2 marked with a battery the relay Tpr2 having two contacts tp21 and tp22 is energized and consequently the selector switch SMV2 is stopped by the change of position of contact tp21. By the closure of make contact tp22 the relay Tptr with six contacts tpt1—6 is energized since contact tp12 has already been closed.

From the above it follows that the selector switches are now both on the position 2 corresponding to the calling room. When they are again operated they will consequently search in synchronism for an available room among the rooms 3, 4, 5, and 1 respectively. By the closure of make contact tpt1 of relay Tptr the latter is locked via contacts tpt1, tz4 and tf12, tf22 in parallel; by the closure of make contact tpt2 the electromagnets Smvr1 and Smvr2 are operated via contacts tpt2, tp11, tv22, tv11, tf11 and tpt2, tp21, tv12, tv21, tf21 respectively; by the closure of make contact tpt3 and tpt4 the brushes of levels LA of SMV1 and SMV2 are connected to battery via the windings of relays Tvr1 and Tvr2 respectively; finally, by the closure of make contacts tpt5 and tpt6 a battery is connected to the one ends of the brushes of the levels LD of the switches SMV1 and SMV2 via contact go5, tpt5, winding of relay Tfr1 and contacts go6, tpt6, winding of relay Tfr2 respectively.

Due to the electromagnets Smvr1 and Smvr2 being energized the selector switches SMV1 and SMV2 are operated so that they start synchronously stepping through their positions 3, 4, 5, 00 and 1, 00 respectively. As will be described hereinafter the one of the switches SMV1 and SMV2 which first tests an available room will be stopped on the position attained. Since the series of rooms tested by SMV1 and SMV2 are located at increasing distances of the calling room, one is sure that the available room closest to this calling room will be detected.

When the brush of level LA of selector switch SMV1 makes contact with the plot 3 of this level the relay Tvr1 with four contacts tv11—tv14 is energized since as described above this plot is connected to ground due to a nurse being present in this room.

By the opening of break contact tv11 of relay Tvr1 the electromagnet Smvr1 is deactivated so that the selector switch SMV1 is stopped on the plot 3; although break contact tv12 is opened the electromagnet Smvr2 remains operated since a battery remains applied to it via contacts tv13 and smv2 so that selector switch SMV2 continues stepping towards position 00 whereon it is stopped due to smv2 being opened. It should be noted that even when a nurse is present in the room 1 scanned by SMV2 this remains without influence since electromagnet Smvr2 remained operated independently from the condition of relay Tvr2. During the passage of the final position plot 00 the relay Tfr2 is temporarily energized but this remains without influence.

By the closure of make contact tv14 a battery is applied to terminal Y3 (not shown) via this contact tv14, brush of level LB of SMV1, plot 3 and control lead v3 (not shown) so that the communication circuit in the third room, wherein a nurse is present, is controlled and that relay Phr is energized therein. The energized relay Phr operates its six contacts ph1 to ph6. By the change of position of contact ph1 and ph2 the one and other input terminals of the loudspeaker LS in this third room are connected to battery and to terminal E3 (not shown) respectively due to which the 1000 c/s tone interrupted under the control of contact *tn* is audible in the third room, thus informing the nurse present therein that a patient is calling in one of the other four rooms. By the closure of make contact *ph*3 the terminal N3 (not shown) of the third station is effectively connected to contact *t*3 via changeover contact *pr*6 in its work position and thus a circuit is prepared for eventually bringing the calling room in the waiting condition; by the closure of make contacts *ph*4 and *ph*5 the terminals I3 and J3 (not shown) of the third room are effectively connected to diode D9 and contact *t*2 so that a circuit is prepared for the eventual operation of relays Z*zr* and S*tr* respectively; by the closure of make contact *ph*6 the terminal M3 (not shown) is effectively connected to key UK via changeover contact *pr*5 in its work position so that a circuit is prepared for eventually removing the calling condition in the calling room.

When the nurse present in the third room hooks-off the telephone, make contacts *t*1 and *t*2 are closed. By the closure of make contact *t*1 the communication circuit of the third room is now effectively established since a DC current feeding the telephone handset flows from ground to battery via variable resistance R1, terminal K3 (not shown), contact *t*1, telephone handset THS diode rectifier D4, terminal Y3 (not shown) control lead *v*3, plot 3 of level LB of selector switch SMV1, brush of this level, contact *tv*14, battery. Hence this communication circuit is prepared for speaking. Since the communication circuit of the calling second room has already been prepared for speaking, as described above, the calling patient in the second room and the nurse in the third room may speak with each other. By the closure of the above telephone make contact *t*2 the relay S*tr* having contact *st* is energized between ground and battery via terminal J2, contacts *ph*5 and *t*2, diode rectifier D10 and key PK. Due to the opening of break contact *st* the output of the tone oscillator TO is disconnected from the terminal E1—5 so that the tone in the loudspeakers of the second and third rooms is cut and that consequently patient and nurse can speak without being disturbed by this tone.

After having conversed with the patient the nurse may remove the calling condition in the calling second room by operating key UK. She will do so when she cannot join the calling patient. By the operation key UK the relay A*r* of the latter room is short-circuited in the following circuit: ground, key UK, contacts *pr*5 and *ph*6, terminal M3 (not shown), terminal M2, contacts *ph*6 and *pr*5, winding of relay A*r*, contacts *a*1 and *pr*2, ground. By the release of relay A*r* the circuits are restored to their rest position, but SMV1 remains in the position attained.

When the nurse after having spoken with the calling patient determines that she must join him, she does not operate the key UK but simply hangs-up her telephone. Thus the call is automatically put in the waiting condition. Indeed, in this case make contact *t*3 is temporarily closed due to which relay C*r* in the calling room is energized in the following circuit: battery, contacts *t*3, *pr*6, *ph*3, terminal N3 (not shown), terminal N2, contacts *ph*3 and *pr*6, resistance R3, winding of relay C*r*, ground. Consequently relay C*r* having two contacts *c*1 and *c*2 is energized and locked between ground and battery via resistance R3, contact *a*4, diode rectifier D5 and contact *c*2. Due to the change of position of contact *c*2 the lamp PL mounted above the door of the second room is operated between ground and battery via diode D12 and this contact *c*2. The thus steadily lit lamp PL indicates the waiting condition of the second room. The change of position of contact *c*1 has no immediate influence. However, when the patient of the second room renews his call by operating key AK the relay C*r* is short-circuited in the following circuit: ground, key AK, contact *c*1, winding of relay C*r*, ground. The further operations are then as described above.

It should be noted that when a nurse hangs-up her telephone after having operated key UK the temporary closure of contact *t*3 remains without influence since in this case relay C*r* cannot lock via contact *a*4.

When a very ill patient needs the help of a nurse he operates the key PSK which by strap S establishes a connection between the junction point of the diode rectifiers D7 and D8 and the junction point of diode rectifier D11 and contact *a*3 and which by key AKP applies a ground to the junction point of key AK and contact *c*1. In this case the operation is as above described for the operation of key AK, although the very ill patient will in general not speak with the nurse. Moreover, however, relay Z*zr* is connected to the output of the symmetrical multivibrator SMV via terminal I2, contact *ph*4, diode rectifier D9, strap S, contact *a*3 and terminal F2, so that this relay is alternately energized and deenergized with a period of 660 ms. Consequently relay T*nr* connected to the output of the asymmetrical multivibrator AMV is alternately, on the one hand, energized and deenergized with a period of 660 ms during a time interval of about 2 seconds and, on the other hand, deenergized during a time interval of about 28 seconds. Hence the contact *tn* is operated at the same rhythm and the tone audible in the loudspeaker of the calling second room and the third room wherein a nurse is present is cut in a corresponding manner.

When a nurse has joined the patient in the calling second room and has operated the presence key PK therein, she may make an alarm call by pushing key AK or PSK. The above described operations are then performed, but moreover relay E*gr* with four contact *eg*1—*eg*4 is energized between battery and ground via winding of relay E*gr*, terminal H2, contact *pr*3, diode rectifier D6, contact *a*5, ground. By the closure of make contact *eg*1 the output of the tone oscillator TO is connected to the one input terminal of the loudspeaker LS in the calling room via contact *tn*, contact *eg*1, terminal E2 and contact *ph*1, the other input terminal of this loudspeaker LS being already connected to battery via contact *ph*2. By the change of position of contact *eg*2 the relay T*nr* is connected to the output of the symmetrical multivibrator SMV and by the change of position of contact *eg*3 the lamp GL is connected to the same output. Consequently the relay T*nr* is alternately energized and deenergized so that the contact *tn* is also alternately closed and opened with a period of 660 ms. Hence, and contrary to what happens in case of a normal call, the tone broadcast in the loudspeaker LS of the calling room and of the found available room is now an intermittently interrupted tone, whereas the corresponding floor indicating lamps such as GL are intermittently lit, both the audible tone and the visible signals indicating the alarm condition.

It should be noted that when a nurse enters a calling room wherein the calling patient has not yet been brought in communication with a nurse in a room, the calling condition is removed when the former nurse operates the presence key PK. Indeed, due to this the relay T*zr* is short-circuited in the following circuit: ground, winding of relay T*zr*, brush of level LA of SMZ, control lead *x*2, terminal X2, contact *pr*1, ground. Relay T*ptr* is then released by the opening of make contact *tz*4 so that the relay T*vr*1 and T*vr*2 cannot be operated.

In the above it has been supposed that an available room is found after the rooms have been scanned for the first time. If this is not so, the selector switches SMV1 and SMV2 substantially synchronously arrive on their final positions. The relays T*fr*1 and T*fr*2 are then energized, so that these switches are stopped by the opening of break contacts *tf*11 and *tf*21 and that the operating circuit of the T*ptr* which must be slowly releasing is opened by the opening of break contacts *tf*12 and *tf*22. When the relay T*ptr* is released the relays T*fr*1 and T*fr*2 are deenergized by the opening of make contacts *tpt*5 and *tpt*6 respectively, and the selector switches SMV1 and SMV2 are again stepped since the electromagnets S*mvr*1 and S*mvr*2 are again energized via the break contacts *tf*11 and *tf*21 respectively. Since the relays T*zr* and G*or* are still operated a new scanning cycle is then started etc., until an available room is found. However, if after the time interval counted by the timing circuit TC no such available room has been detected the alarm buzzer AB is operated thus informing the head nurse in the general control room that nobody has taken care of a calling patient. In this case, the head nurse handles the call herself.

Figures 2, 3:
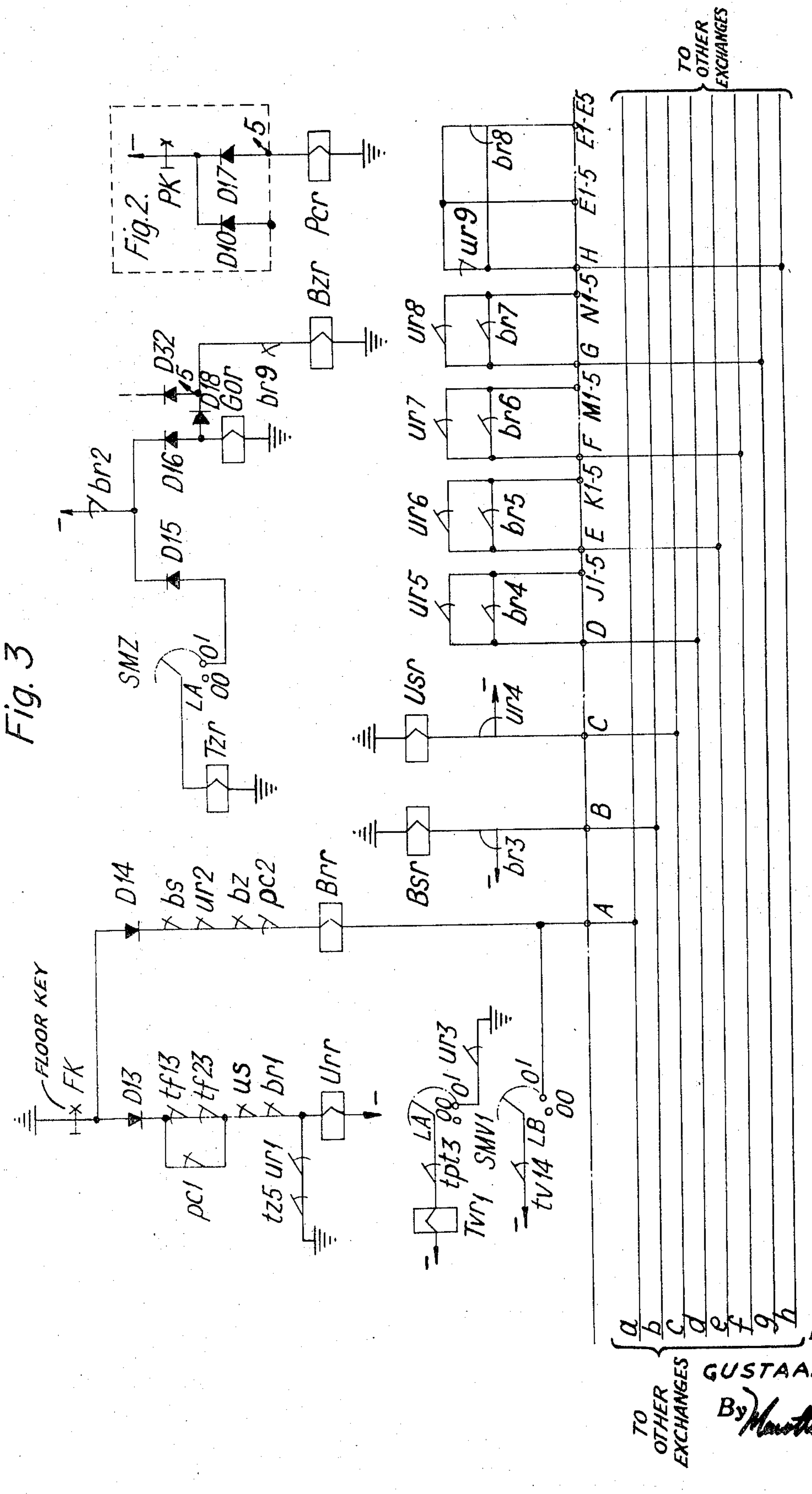
FIG. 3 represents additional circuitry provided in the main station of FIG. 1.

As described above the exchange shown in FIG. 1 controls the rooms located on a same floor and when there are a plurality of floors the various exchanges operate independently from one another. Referring to the FIGS. and more particularly to FIG. 3 additional means are hereinafter described which enable a cooperation of for instance four exchanges in such a manner that when no available room is found in one exchange after the selector switches SMV1 and SMV2 included therein have performed about two test cycles, a search for an available room is made in one of the other exchanges if no calling is being handled in the latter. The four exchanges hereinafter called A, B, C and D are interconnected via the leads *a* to *h*, the circuitry of exchange A being shown in FIGS. 1 and 3.

The above additional means include a key FK and the relays U*rr*, B*rr*, B*sr*, U*sr*, B*zr* and P*cr*. The locking key FK when operated in the exchange A permits the cooperation of this exchange with the other exchanges B, C, D if the key FK has been operated in these exchanges. Relay U*rr* is used to indicate an outgoing call i.e. a request by the exchange A for the intervention of one of the exchanges B, C, D upon the exchange A having not found an available room; relay B*rr* serves to indicate an incoming call i.e. a request for the intervention of the exchange A by one of the other exchanges B, C, D when the latter have not found an available room; relay U*sr* is used to prevent an exchange from making outgoing calls; relay B*sr* serves to prevent an exchange from accepting incoming calls; relay P*cr* is used to indicate that in at least one of the rooms controlled by the exchange the nurse presence key PK has been operated; relay B*zr* is used to indicate, together with relay G*or*, that a local call is being handled in the exchange.

It is now supposed that a call is made in a room controlled by the exchange A wherein the key FK has been operated. It is also assumed that the keys FK have been operated in the other exchanges and that the other circuits are in the rest condition shown. Relay P*cr* and its contacts *pc*1 and *pc*2 are not considered in the description following.

The operation is as described above except that relay B*zr* is energized via break contact *br*9 when a battery is applied to one of the diodes D31 to D35 of which only D32 is shown, the latter battery also energizing relay G*or*. In other words for a local call both the relays G*or* and B*zr* are operated. By the opening of break contact *bz* the incoming call relay B*rr* is then prevented from being energized. When it is assumed that no nurse is present in the rooms controlled by the exchange A the selector switches SMV1 and SMV2 are stopped on their final position due to which the relays T*fr*1 and T*fr*2 are temporarily energized, whereafter these switches are stepped further, as already described above. In the present case the outgoing call relay U*rr* is however operated by the closure of the make contacts *tf*13 and *tf*23 in the following circuit: ground, key FK, diode rectifier D13, contacts *tf*13, *tf*23, *us*, *br*1, winding of relay U*rr*, battery. By the closure of make contact *ur*1 the relay U*rr* is locked via this contact *ur*1 and make contact *tz*5 of relay T*zr*; by the opening of break contact *ur*2 the operation of the incoming call relay B*rr* is also prevented; by the closure of make contact *ur*3 a ground is connected to the penultimate plot *o'* of the level LA of the selector switch SMV1; and by the change of position of changeover contact *ur*4 the operation of relay U*sr* is prevented and a battery is applied to the three other exchanges B, C, D via terminal C and lead *c* due to which relay U*sr* is energized in each of these exchanges via contact *ur*4. The latter exchanges B, C, D are thus each prevented from making outgoing calls since contact *us* of the operated relay U*sr* prevents the operation of the relay U*rr* in these exchanges. By the closure of make contacts *ur*5 to *ur*8 in exchange A the terminals J1—5, K1—5, M1—5 and N1—5 are effectively connected to the leads *d* to *g* via terminals D to G respectively; by the change of position of contact *ur*9 the terminal E1—5 of the exchange A is effectively connected to the lead *h* via terminal H. Hereby it should be noted that the terminal E1—5, instead of being directly connected to the terminals E1 to E5 of the rooms, is now connected therewith via changeover contact *br*8 which also permits the establishment of a connection between the terminals E1 to E5 and terminal H. As mentioned above the selector switches SMV1, SMV2 of exchange A are stepped further. If again no available room is found during this second test cycle the relay T*vr*1 is energized when the brush of level LA of selector switch SMV1 arrives in the penultimate position since the penultimate plot *o'* has been grounded. By the closure of make contact *tv*14 a battery is then connected to one end of the brush of level LB of SMV1 and hence via terminal A to lead *a* interconnecting the four exchanges A to D. Due to this the relays B*rr* may be operated in the exchanges B, C and D but due to these relays being not perfectly identical this will happen first for instance in exchange B. In this exchange B the incoming call relay B*rr* is energized in the following manner: battery on lead *a*, winding of relay B*rr* in exchange B, contacts *bz*, *ur*2 and *bs*, diode rectifier D14, key FK, ground. By the opening of break contact *br*1 the operation of the outgoing call relay U*rr* is prevented; by the closure of make contact *br*2 a battery is applied via diode rectifier D15 to the penultimate plot *o'* of the level LA of the selector switch SMZ and relay G*or* is energized via diode rectifier D16. In this manner a calling condition is simulated in exchange B. By the change of position of changeover contact *br*3 a battery is applied to lead *b* via terminal B due to which the relay B*sr* is energized in the exchanges A, C and D via contact *br*3. By the operation of relay B*sr* and more particularly by the opening of break contact *bs* the relays B*rr* are prevented from being operated in the latter exchanges. Even if, in the exchanges C and D, the operation of relay B*rr* would have started, it would be immediately released by the above. By the closure of make contacts *br*4 to *br*7 the terminals J1—5, K1—5, M1—5 and N1—5 of the exchange B are effectively connected to the leads *d* to *g* via the terminals D to G. Consequently the exchanges A and B are effectively interconnected via the contacts *ur*5—*ur*8 in exchange A, leads *d* to *g* and contacts *br*4—*br*7 in exchange B. By the change of position of contact *br*8 the rooms associated to the exchange B are disconnected from the terminal E1—5 and connected to terminal H. Consequently the rooms associated to the exchanges A and B are interconnected via contacts *br*8 and *ur*9 in exchange A and *br*8 in exchange B and all these rooms are connected to terminal H of exchange A i.e. they are all coupled to the tone oscillator in the latter exchange. By the opening of break contact *br*9 the operation of relay B*zr* in exchange B is prevented, and incoming call being hence characterized by an operated relay G*or* and a released relay B*zr*.

By the operation of relay G*or* the incoming call is then handled in the exchange B in the manner described above, the calling condition being now present on the penultimate plot *o'* of the selector switch XMZ and when the call has been handled the circuits are restored to their rest condition.

During the day in general at least one nurse is present on each of the floors of the hospital and when a nurse is temporarily absent on a floor a search is made on one of the other floors upon a patient making a call on the floor whereon no nurse is present, as described above. During the night however, the number of nurses may be smaller than the number of floors so that quite often a search will have to be made on one of the other floors. In order to speed up this search each exchange is provided with a relay P*cr* which is connected to the keys PK of the associated rooms in such a manner that it is energized when at least one of these keys is operated, the relay in the released condition inhibiting the search on one of the other floors whereon no nurse is present. Indeed, when relay P*cr* is in the released condition, it prevents the operation of the incoming call relay B*rr* of the latter exchange via its make contact *pc*2. Moreover, instead of operating relay U*rr* after having executed about two test cycles in the exchange controlling the calling floor, the relay U*rr* is already energized during the first test cycle. Indeed, the relay Urr is normally energized via break contact *pc*1 so that a ground is steadily connected to the penultimate plot *o'* of the selector switch SMV1.

In the above a solution has been described wherein the test means simultaneously test and select the availability of the stations in a predetermined order. Although this is a preferred solution, it should be noted that it is also possible to arrange the system in such a manner that said test means simultaneously test the availability of the stations and to afterwards select these stations in said order.

Therefore, while the principles of the invention have been described in connection with specific apparatus, it is to be clearly understood that this description is made only by way of example and not as a limitation on the scope of the invention.

I claim:

1. A communication system comprising:
- a plurality of communication stations, any one of which may be a calling station;
- means for generating an availability criterion at each station;
- means for testing said plurality of stations for said availability criterion in an order depending upon the identity of the calling station; and
- means for establishing a communication path between the calling station and the first station in said order exhibiting said availability criterion.

2. Communication system according to claim 1, wherein said order depends on the location of said stations with respect to said calling station.

3. Communication system according to claim 2, wherein said order corresponds to increasing distances between said calling station and the tested stations.

4. Communication system according to claim 3, in which said test means include two test devices which are capable of testing all said communication stations in a first predetermined order and in a second order which is the reverse of said first order respectively.

5. Communication system according to claim 4, in which said test devices start said test for availability in a synchronous manner beginning with the stations nearest to said calling station.

6. Communication system according to claim 5, wherein said test devices, before executing said tests for availability, execute a test to find said calling station.

7. Communication system according to claim 1, further including a main station, and wherein each of said plurality of communication stations includes a calling condition registering circuit and an availability condition registering circuit, both coupled to said main station, and a communication circuit involved in the communication between stations coupled at one end to corresponding one ends of the communication circuits of the other communication stations and to one pole of a DC source in the main station, and coupled at the other end individually to the other pole of said DC source.

8. Communication system according to claim 7, wherein said one ends of the communication circuits of all the communication stations are connected to said one pole via a resistance.

9. Communication system according to claim 7 in which said main station includes a common calling condition registering circuit coupled to said communication station calling condition registering circuits, a calling station first control unit, an available station second control unit and a plurality of marking leads between said calling station first control unit and said available station first second control unit wherein said calling station first control unit includes a detection device, coupled to the communication station calling condition registering circuits and adapted to detect a calling station, a first common communication control circuit, coupled to said other ends of the communication station communication circuits and adapted to control the communication circuit of a detected calling station, and a marking circuit to mark the identity of each detected calling station in said available station second control unit via a respective one of said marking leads, and wherein said available station control unit includes said test means in the form of two test devices, which test devices are each coupled to the communication station availability condition registering circuits and to all said marking leads and which are each adapted to detect a marked calling station and an available station, and second common communication control circuits, each associated to a respective test device and coupled to said other ends of the communication station communication control circuits and adapted to control the communication circuit of an available communication station.

10. Communication system according to claim 9, wherein said main station common calling condition registering circuit when operated is adapted to initiate said detection device, and wherein said main station common calling condition registering circuit and said detection device when operated simultaneously are adapted to start said test means.

11. Communication system according to claim 10, including means for registering the fact that both of said test devices have tested said calling station, said register means in the nonoperated condition and in the operated condition preventing and enabling said test devices respectively in order that said test devices should execute tests for availability.

12. Communication system according to claim 11, in which when a communication station calling condition registering circuit is operated said main station common calling condition registering circuit is operated due to which the operation of said detection device is started, wherein upon the detection of said calling station by said detection device said first common communication control circuit is operated so as to prime the communication circuit of said calling station for operation, and the identity of said calling station is marked by said marking circuit in said test devices and said test devices are operated, wherein upon the test of the marked calling station by a test device the operation thereof is stopped and afterwards restarted synchronously with the other test device when the latter has also tested the calling station, and wherein when an available station is tested by one of said test devices its operation is stopped and one of said second common communication control circuits is operated so as to prepare for operation the communication circuit of said available station.

13. Communication system according to claim 9, in which each said communication station includes an operation registering means adapted to register the operation of one of said first and second common communication control circuits.

14. Communication system according to claim 13, wherein said main station includes an audible tone oscillator coupled to a loudspeaker in each of said communication stations, said audible tone oscillator being operated when said main station common calling condition registering means have been operated, and wherein said communication station operation registering means, when operated, effectively connect said loudspeaker to said main station.

15. Communication system according to claim 14, wherein said communication station communication circuit includes a telephone which when hooked-off breaks the connection between said tone oscillator and said loudspeaker and prepares the communication station communication circuit for operation.

16. Communication system according to claim 13 wherein each communication station calling condition registering circuit is coupled to the calling condition registering circuits of the other communication stations and are each coupled to a first key which when operated in an available station, wherein said availability condition registering circuit and said operation registering means thereof have been operated, is able to render inoperative the calling condition registering circuit in a calling station in which said operation registering means has been operated.

17. Communication system according to claim 16, wherein each of said communication stations includes a waiting condition indicating circuit which when operated indicates that the corresponding station is placed in stand-by condition and which is coupled to the waiting condition indicating circuits of the other communication stations, and wherein each said communication station includes a second key which is connected to said waiting condition indicating circuit and which when operated in an available station, wherein said availability condition registering circuit and said operation registering means have been operated, is able to operate the waiting condition indicating circuit in another calling station which said operation registering means has been operated.

18. Communication system according to claim 17, in which said second key is associated to a telephone in said communication station communication circuit and is temporarily operated when said telephone is hooked-on.

19. Communication system according to claim 9, wherein said calling station first control unit of said main station includes a first three-level selector switch, the first, second and third levels of which form part of said detection device, said first common communication control circuit, and said marking circuit respectively and the plots of which are coupled to said communication station calling condition registering circuits, to communication station operation registering means in each of said communication stations, and to said marking leads respectively, and wherein said available station second control unit in said main station includes two second selector switches with at least three levels, two levels of each of which form part of a respective one of said test devices and the third level of which forms part of a respective one of said second common communication control circuits and the plots of said two levels being coupled to said communication station availability condition registering circuits and to said marking leads respectively and said third level being coupled to said communication station operation registering means.

20. Communication system according to claim 19, wherein all the communication stations are arranged in a plurality of groups to each of which is associated a said test means, the various test means being coupled together by automatic switching means in such a manner that when a test means does not find an available station in the associated group a test means associated to another group is automatically operated via said automatic switching means.

21. Communication system according to claim 20, in which a main station is associated with each of said plurality of groups, wherein each said main station includes a request emitting circuit, which is operated when the associated test means does not find an available station, and a request registering circuit which is coupled to the request emitting circuits of the other main stations, to said detection device, and to said common calling condition registering circuit in such a manner that when a request emitting circuit in a main station is operated, a request registering circuit is operated in at least one of said other main stations due to which said common calling condition registering circuit thereof is brought into operation and a calling condition is thus simulated therein.

22. Communication system according to claim 21, in which said automatic switching means are controlled by said request emitting and request registering circuits.

23. Communication system according to claim 22, in which each said main station includes means to prevent the simultaneous operation in a same main station of said request emitting circuit and said request registering circuit.

24. Communication system according to claim 23, wherein each of said plurality of groups is associated to availability indicating means, which when operated indicates that at least one of the communication stations of this group is available and enables the operation of said automatic switching means whose operation is prevented when said availability indicating means is in the nonoperated condition.